United States Patent [19]

Brown

[11] Patent Number: 4,885,140
[45] Date of Patent: Dec. 5, 1989

[54] EXHAUST TREATING APPARATUS

[76] Inventor: William R. Brown, 1018 W. Jackson St., Muncie, Ind. 47305

[21] Appl. No.: 852,020

[22] Filed: Apr. 14, 1986

[51] Int. Cl.$^4$ .............................................. F01N 3/08
[52] U.S. Cl. ....................................... 422/174; 60/303; 422/169
[58] Field of Search ...................... 422/108, 169, 174; 60/303

[56] References Cited

U.S. PATENT DOCUMENTS

| | | | |
|---|---|---|---|
| 2,577,720 | 12/1951 | Waller | 422/174 |
| 2,728,408 | 12/1955 | Deliman | 422/174 |
| 2,851,852 | 9/1958 | Cornelius | 422/174 |
| 2,937,490 | 5/1950 | Calvert | 60/303 |
| 3,846,981 | 11/1974 | Paczkowski | 60/286 |
| 3,902,854 | 9/1975 | Brown | 23/277 |
| 4,163,772 | 8/1979 | Brown | 422/108 |
| 4,258,296 | 3/1981 | Gerry | 315/209 |
| 4,259,939 | 4/1981 | Coates | 123/605 |
| 4,291,661 | 9/1981 | Gerry | 123/606 |
| 4,362,016 | 12/1982 | Papadopulos | 60/297 |

Primary Examiner—Barry S. Richman
Assistant Examiner—Timothy M. McMahon
Attorney, Agent, or Firm—Fleit, Jacobson, Cohn, Price, Holman & Stern

[57] ABSTRACT

A DC voltage source connected through an input terminal to the primary winding of an ignition transformer is constantly loaded by connection through an output terminal to a directly grounded secondary winding. The windings are connected through the output terminal to one electrode to a spark plug, the other electrode as well as the spark gap being exposed to a grounded, moisture-laden body of exhaust products that are intermittently ignited by electrical discharge across the spark gap.

6 Claims, 2 Drawing Sheets

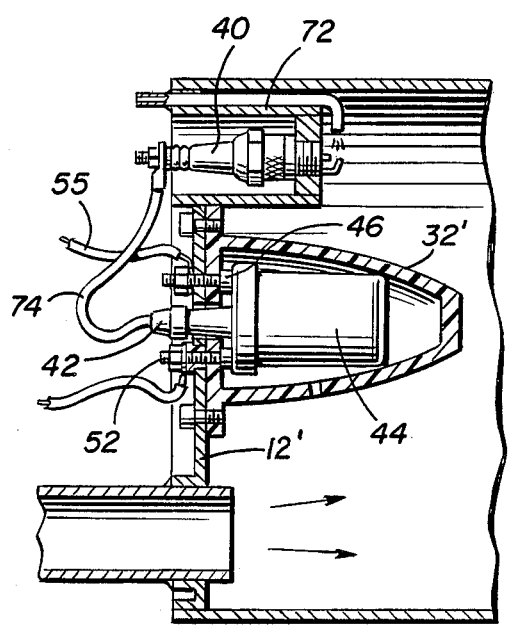
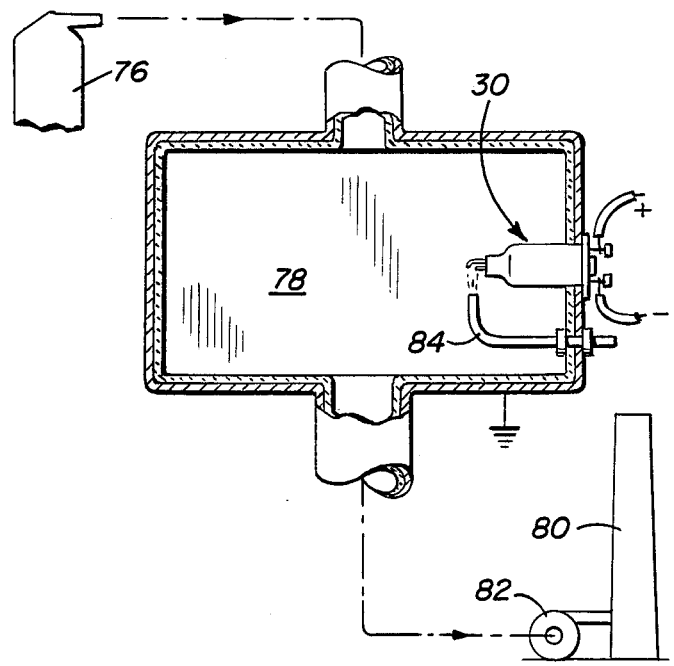
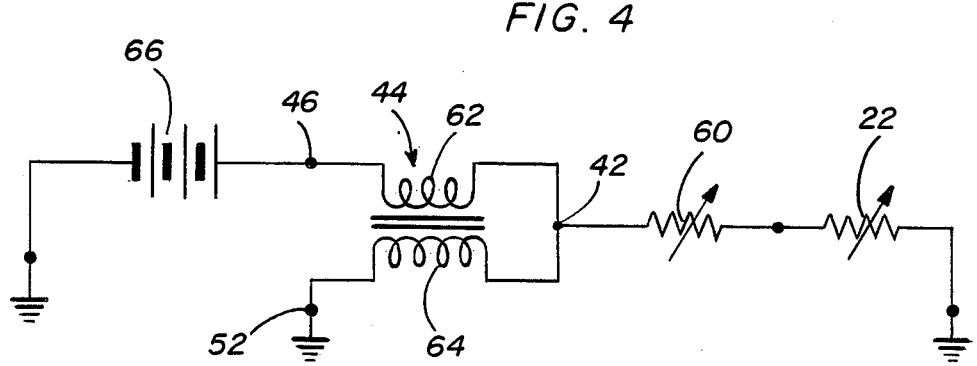

EXHAUST TREATING APPARATUS

BACKGROUND OF THE INVENTION

This invention relates in general to treatment of exhaust gases or the like, and is an improvement over the electrical ignition devices for for treating exhausts as disclosed in my prior U.S. Pat. Nos. 3,902,854 and 4,163,772, respectively issued Sept. 2, 1975 and Aug. 7, 1979.

In the foregoing type of electrical ignition devices, the exhaust gases being treated are conducted through a chamber mixed with moisture to control the electrical conductivity of the exhaust. A spark plug in the chamber intermittently ignites the moisture laden exhaust mixture by means of arcs produced across the gap between electrodes by peak voltage output of a transformer or ignition coil device powered from a D.C. source of voltage. According to my earlier patent, peak voltages are produced by timed operation of an interrupter switch through which the voltage source is connected across the primary winding of the transformer device. According to my later patent, the interrupter switch is replaced by connection of the primary winding to a current control terminal exposed to the moisture laden mixture in the grounded chamber through which voltage fluctuation across the primary winding is controlled by the conductivity of the exhaust mixture.

SUMMARY OF THE INVENTION

In accordance with the present invention, the primary and secondary windings of the ignition transformer device are directly interconnected in series to between negative ground and the DC source of voltage for constant loading thereof upon closing of the ignition switch. The interconnection of the primary and secondary windings is established at a juncture constituting an output terminal of the transformer device to which one electrode of the spark plug is connected, the other electrode being exposed to the exhaust mixture in the exhaust treating chamber which is electrically grounded. Moisture laden exhaust of variable electrical conductivity accordingly completes a circuit through the windings in parallel with the constant loading path established to negative ground in order to produce a fluctuating voltage having a voltage peak which causes arcing across the gap between spark plug electrodes. The arcing ignites the exhaust mixture resulting in a combustion type of reaction causing an abrupt change in the conductivity of the mixture. The moisture content of the exhaust mixture as well as the composition of the exhaust thereby automatically control the frequency of ignition discharge across the electrode gap without any interrupter switch action to reactively treat the exhaust and reduce its polluting affect in a unique and efficient manner.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a partial side sectional view of an exhaust treating apparatus in accordance with another embodiment of the invention.

FIG. 4 is a diagram of an equivalent circuit corresponding to the embodiments of FIGS. 1-3.

FIG. 5 is a partially schematic illustration of a stationary power generating installation for the present invention.

DETAILED DISCLOSURE OF THE PREFERRED EMBODIMENTS

Figure 1:
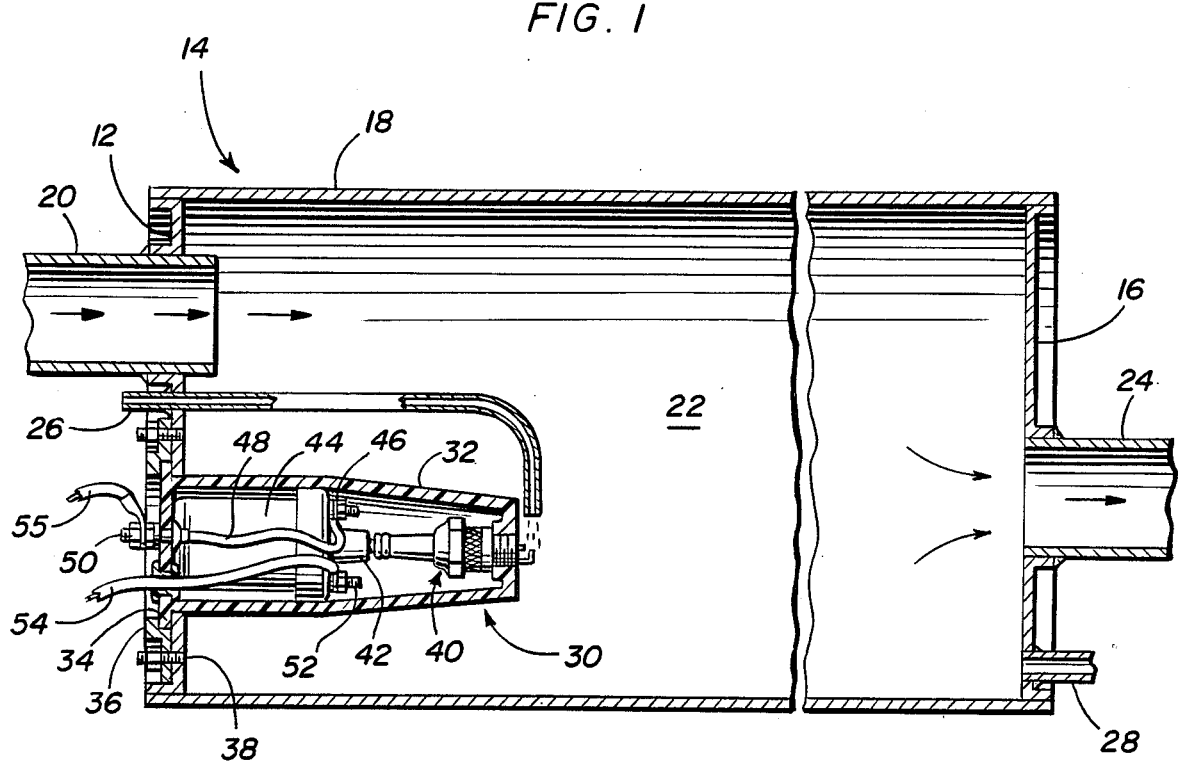
FIG. 1 is a side sectional view through an exhaust treating apparatus in accordance with one embodiment of the invention.

Referring now to the drawings in detail, FIG. 1 illustrates one embodiment of exhaust treating apparatus associated with an automotive vehicle installation, generally referred to by reference numeral 14. Fuel combustion product exhaust from the vehicle engine enters a metallic housing 18 of the apparatus through an inlet conduit section 20. The housing is electrically grounded and encloses a flow stream chamber 22 from which a fluent mixture exits through an outlet conduit section 24. The inlet and outlet conduit sections are respectively mounted on end walls 12 and 16 of the housing at opposite axial ends thereof. A restricted air inlet port 26 is formed in end wall 12 while a water drain port 28 is formed in end wall 16. The fluent mixture in chamber 22 is formed by the inflow of exhaust through inlet 20, inflow of moisture laden air through port 26 and intermittent reaction produced by a reaction generating unit 30 mounted on the end wall 12 within the housing chamber 22.

The unit 30 includes an electrically non-conductive housing 32 having a mounting flange 34 at one axial end secured to the housing end wall 12 by means of an annular retainer 36 and fasteners 38. The inner axial end of the housing 32 threadedly mounts a conventional type of automotive engine spark plug 40 with the spaced electrodes thereof projecting into the chamber 22. The spark plug is in electrical contact with an output terminal 42 of an ignition coil or transformer device 44 fixedly held in housing 32 in abutment with the mounting flange 34. An input terminal 46 of the ignition coil device 44 is electrically connected to a source of DC voltage through conductor 48, positive terminal 50 and conductor 55 in the embodiment of FIG. 1 as shown. A third terminal 52 of the coil device is directly connected to fixed negative ground through a ground connection 54.

Figure 2:
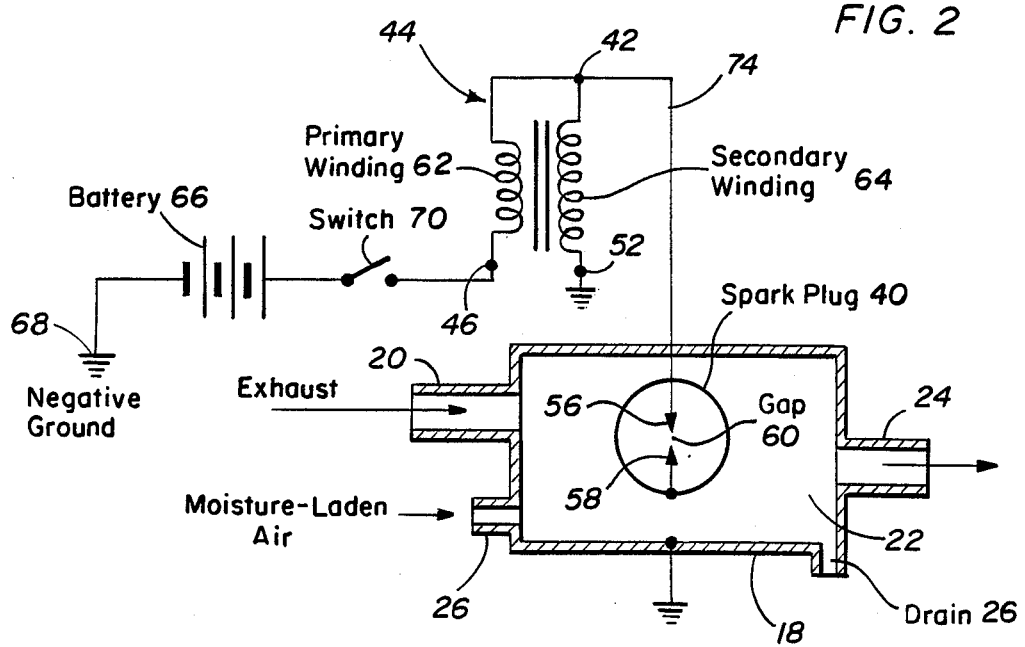
FIG. 2 is a schematic illustration of the exhaust treating system associated with the apparatus shown in FIG. 1.

As diagrammed in FIG. 2, the electrodes 56 and 58 of the spark plug 40 form a current path through the mixture in chamber 22 to ground so as to act as a "breaker" causing fluctuation of the current conducted through the electrode gap 60 in series with the primary and secondary windings 62 and 64 of the transformer device 44. The electrical conductivity of the mixture, to which the gap 60 is exposed, will also control the current conducted from the DC voltage source at the input terminal 46 of the transformer 44 through its primary winding 62. The moisture laden mixture in chamber 22 and its conductivity in the electrode gap 60 are therefore the equivalent of series connected variable loading resistors connected to ground in series with the parallel connected windings 62 and 64 of the transformer 44 as diagrammed in the equivalent circuit shown in FIG. 4. The secondary winding 64 is also directly connected to ground at terminal 52 and in series with the primary winding 62 through a juncture forming the output terminal 42. The DC voltage source is derived from a battery 66 having a negative ground 68 and a positive output applied through ignition switch 70 to the input terminal 46 of the primary winding 62.

It will become apparent from the foregoing description that closing of switch 70, will constantly load the battery by applying its DC voltage across the primary and secondary windings interconnected in series by the juncture of output terminal 42 directly to fixed ground at ground terminal 52. Assuming an initial substantially zero electrical conductivity in gap 60, a relatively low volt drop will then occur across the primary winding. As the moisture in chamber 22 and the conductivity of gap 60 increases toward low resistance values, the voltage across the primary winding increases toward full battery voltage. Accordingly, variation of the conductivity of the mixture in chamber 22 will produce a fluctuating voltage across the primary winding 62 to induce a higher fluctuating voltage across the secondary winding 64 disposed in inductive relation to the primary winding in a voltage step-up transformer configuration of device 44. The voltage induced in the secondary winding is applied through output terminal 42 across the electrode gap 60 and when it approaches a peak level, a spark is generated to ignite the mixture and produce a reaction. The reaction causes a sudden change in mixture conductivity. Mixture reactive ignition will therefore occur in a cyclic manner, affected in magnitude and frequency by variation in moisture content of the inflowing air and variation in fuel combustion.

A modified arrangement is shown in FIG. 3 which is basically the same circuit-wise as shown in FIG. 2. The spark plug 40 is mounted in a separate metallic enclosure 72 on the end wall 12' through which electrode 58 is grounded. Accordingly, the other electrode 56 is electrically connected by a conductor 74 to the output terminal 42 of transformer 44 enclosed in its non-conductive housing 32'. The ground terminal 52 is also connected to negative ground by conductor 54 while input terminal 46 is directly connected to DC voltage conductor 55 from the battery switch.

The battery 66 and switch 70 may form part of the usual ignition circuit associated with an automotive vehicle installation so that the vehicle installation embodiments described will provide exhaust gas treatment for pollution reducing purposes. The spark plug 40 not only serves to vary combustion completing reactions as a function of the variables aforementioned, but also serves as a "breaker" to enable the transformer 44 to induce the reaction generating voltage.

The invention as hereinbefore described is also applicable to stationary industrial installations to perform exhaust gas treatment as referred to in my prior U.S. patents aforementioned. For example, combustion products exhausted from the top of a steam generator 76 of a power plant may be treated by passage through an exhaust gas treating chamber 78 as diagrammatically shown in FIG. 5. The flow of exhaust from the steam generator through chamber 78 to the smoke stack 80 is induced by a draft fan 82 while aerosol water is introduced into chamber 78 by a spray device 84 under control of input sensors to regulate the moisture content of the exhaust mixture being treated. A reaction generating unit 30' is mounted in the chamber 78 and operates in a manner similar to unit 30 hereinbefore described.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an electrically grounded housing enclosing a chamber through which fluent products are conducted together with an inflow of moisture to establish variable electrical conductivity within the chamber, a spark plug mounted within the housing having electrodes spaced from each other by a gap within said chamber, transformer means having a secondary winding and a primary winding, and a DC source of voltage connected to the primary winding, the improvement comprising a ground terminal directly connected to the secondary winding and a juncture interconnecting the primary and secondary windings in series between the DC voltage source and the ground terminal to load the voltage source and voltage fluctuating means operatively connecting one of the electrodes of the spark plug in series with the primary winding for loading thereof as a function of said variable conductivity within the chamber between the other of the electrodes and the grounded housing to induce a spark generating voltage in the secondary winding applied across the gap of the spark plug.

2. The improvement as defined in claim 1 wherein the voltage fluctuating means includes means electrically connecting to said juncture directly to said one of the electrodes of the spark plug and means for exposing the other of electrodes within the chamber.

3. In combination with a chamber enclosing a body of material of variable electrical conductivity, a pair of electrodes mounted in spaced relation to each other forming a gap within said chamber, a source of voltage, and transformer means including a primary winding connected to said voltage source and a secondary winding, the improvement comprising an output terminal interconnecting the windings in series, means for directly grounding the secondary winding and voltage fluctuating means operatively connecting said output terminal to one of the electrodes for varying voltage across the primary winding to induce a reaction generating voltage in the secondary winding applied across the gap between the electrodes.

4. The improvement as defined in claim 3 wherein the voltage fluctuating means includes an electrical connection between said one of the electrodes and the output terminal, means for exposing the other of the electrodes within the chamber and means for grounding said chamber.

5. The improvement as defined in claim 3 wherein the voltage fluctuating means includes an electrical connection between said one of the electrodes and the output terminal and means for grounding the body of material in common with the secondary winding.

6. In combination with an electrically grounded enclosure through which a flow of fluent material is conducted to establish an electrical path therein of variable electrical conductivity, a spark plug mounted within said enclosure having a pair of electrodes spaced apart by an ignition gap, one of said electrodes being exposed within the enclosure and from which said electrically conductive path extends therein, a source of DC voltage, an ignition transformer having primary and secondary windings, said secondary winding being connected to ground, juncture means for electrically connecting the primary winding in series with the secondary winding between the DC source and said ground and means connecting the juncture means to the other of the electrodes for varying voltage applied across the primary winding as a function of the variable conductivity to induce an ignition voltage in the secondary winding, said juncture means being electrically connected to the other of the electrodes to apply ignition voltage across the ignition gap.

* * * * *